(12) United States Patent
Chen (10) Patent No.: US 8,810,533 B2
(45) Date of Patent: Aug. 19, 2014

(54) SYSTEMS AND METHODS FOR RECEIVING GESTURE INPUTS SPANNING MULTIPLE INPUT DEVICES

(75) Inventor: Tong Chen, Markham (CA)

(73) Assignee: Z124, George Town (KY)

(*) Notice: Subject to any disclaimer, the term of this patent is extended or adjusted under 35 U.S.C. 154(b) by 207 days.

(21) Appl. No.: 13/187,026

(22) Filed: Jul. 20, 2011

(65) Prior Publication Data

US 2013/0021262 A1 Jan. 24, 2013

(51) Int. Cl.
*G06F 3/041* (2006.01)
*G06F 1/16* (2006.01)
*G06F 3/0488* (2013.01)
*G06F 3/0486* (2013.01)

(52) U.S. Cl.
CPC ............ *G06F 3/0488* (2013.01); *G06F 1/1647* (2013.01); *G06F 3/0486* (2013.01); *G06F 2203/04803* (2013.01)
USPC ....................................................... 345/173

(58) Field of Classification Search
CPC ..................................................... G06F 3/041
USPC ....................................................... 345/173
See application file for complete search history.

(56) References Cited

U.S. PATENT DOCUMENTS

| 5,252,951 A | 10/1993 | Tannenbaum et al. |
| 6,243,645 B1 | 6/2001 | Moteki et al. |
| 6,331,840 B1 * | 12/2001 | Nielson et al. ................. 345/1.1 |
| 6,545,669 B1 * | 4/2003 | Kinawi et al. ................ 345/173 |
| 6,573,883 B1 | 6/2003 | Bartlett |
| 6,861,946 B2 | 3/2005 | Verplaetse et al. |
| 7,840,912 B2 | 11/2010 | Elias et al. |
| 7,844,301 B2 | 11/2010 | Lee et al. |
| 7,917,584 B2 | 3/2011 | Arthursson |
| 8,171,427 B2 | 5/2012 | Chung et al. |
| 8,291,344 B2 | 10/2012 | Chaudhri |
| 8,527,892 B2 | 9/2013 | Sirpal et al. |
| 2004/0172279 A1 | 9/2004 | Carolan et al. |
| 2005/0030255 A1 | 2/2005 | Chiu et al. |
| 2006/0161868 A1 | 7/2006 | Van Dok et al. |
| 2006/0206825 A1 | 9/2006 | Dorn et al. |
| 2006/0227106 A1 | 10/2006 | Hashimoto et al. |
| 2007/0046643 A1 | 3/2007 | Hillis et al. |
| 2007/0064004 A1 | 3/2007 | Bonner et al. |
| 2007/0192749 A1 | 8/2007 | Baudisch |
| 2008/0062625 A1 | 3/2008 | Batio |
| 2008/0152263 A1 | 6/2008 | Harrison |
| 2008/0168290 A1 | 7/2008 | Jobs et al. |
| 2008/0307351 A1 | 12/2008 | Louch et al. |

(Continued)

OTHER PUBLICATIONS

International Preliminary Report on Patentability for International (PCT) Patent Application No. PCT/US11/53937, mailed Apr. 11, 2013 10 pages.

(Continued)

*Primary Examiner* — Fred Tzeng
(74) *Attorney, Agent, or Firm* — Sheridan Ross P.C.

(57) ABSTRACT

Systems and methods for operating a handheld computing device having more than one input device. An input event may be received at one of the input devices. The location of the input event may be translated into a location with respect to a global virtual space. This translated location may in turn be passed to an application executing on the device. Additionally, systems and methods are provided for recognition of a gesture input spanning more than one independent input device.

17 Claims, 7 Drawing Sheets

(56) References Cited

U.S. PATENT DOCUMENTS

| | | |
|---|---|---|
| 2009/0027354 A1 | 1/2009 | Perski et al. |
| 2009/0073194 A1 | 3/2009 | Ording |
| 2009/0102744 A1 | 4/2009 | Ram |
| 2009/0204925 A1 | 8/2009 | Bhat et al. |
| 2009/0209350 A1 | 8/2009 | Kelly et al. |
| 2009/0213081 A1 | 8/2009 | Case, Jr. |
| 2009/0259967 A1 | 10/2009 | Davidson et al. |
| 2009/0278806 A1 | 11/2009 | Duarte et al. |
| 2009/0298537 A1 | 12/2009 | Choi |
| 2009/0303187 A1 | 12/2009 | Pallakoff |
| 2009/0303231 A1 | 12/2009 | Robinet et al. |
| 2010/0020025 A1 | 1/2010 | Lemort et al. |
| 2010/0031186 A1 | 2/2010 | Tseng et al. |
| 2010/0031202 A1 | 2/2010 | Morris et al. |
| 2010/0064244 A1 | 3/2010 | Kilpatrick, II et al. |
| 2010/0064536 A1 | 3/2010 | Caskey et al. |
| 2010/0081475 A1 | 4/2010 | Chiang et al. |
| 2010/0083154 A1 | 4/2010 | Takeshita |
| 2010/0146464 A1 | 6/2010 | Wilson et al. |
| 2010/0156836 A1 | 6/2010 | Katayama |
| 2010/0162128 A1 | 6/2010 | Richardson et al. |
| 2010/0175018 A1 | 7/2010 | Petschnigg et al. |
| 2010/0180297 A1 | 7/2010 | Levine et al. |
| 2010/0182247 A1 | 7/2010 | Petschnigg et al. |
| 2010/0188352 A1 | 7/2010 | Ikeda |
| 2010/0211872 A1 | 8/2010 | Rolston et al. |
| 2010/0211920 A1 | 8/2010 | Westerman et al. |
| 2010/0214237 A1 | 8/2010 | Echeverri et al. |
| 2010/0227650 A1 | 9/2010 | Kim et al. |
| 2010/0231536 A1 | 9/2010 | Chaudhri et al. |
| 2010/0245209 A1 | 9/2010 | Miller et al. |
| 2010/0245256 A1 | 9/2010 | Estrada et al. |
| 2010/0287513 A1 | 11/2010 | Singh et al. |
| 2010/0295781 A1 | 11/2010 | Alameh et al. |
| 2010/0298032 A1 | 11/2010 | Lee et al. |
| 2011/0039603 A1 | 2/2011 | Kim et al. |
| 2011/0047459 A1 | 2/2011 | Van Der Westhuizen |
| 2011/0069021 A1 | 3/2011 | Hill |
| 2011/0074696 A1 | 3/2011 | Rapp et al. |
| 2011/0081889 A1 | 4/2011 | Gao et al. |
| 2011/0090255 A1 | 4/2011 | Wilson et al. |
| 2011/0107272 A1 | 5/2011 | Aguilar et al. |
| 2011/0145768 A1 | 6/2011 | Leffert et al. |
| 2011/0209058 A1 | 8/2011 | Hinckley et al. |
| 2011/0209102 A1 | 8/2011 | Hinckley et al. |
| 2011/0209104 A1 | 8/2011 | Hinckley et al. |
| 2011/0221678 A1 | 9/2011 | Davydov |
| 2011/0242138 A1 | 10/2011 | Tribble |
| 2011/0265021 A1 | 10/2011 | Chien et al. |
| 2011/0285631 A1 | 11/2011 | Imamura et al. |
| 2012/0050779 A1 | 3/2012 | Tani et al. |
| 2012/0081293 A1 | 4/2012 | Sirpal et al. |
| 2012/0081306 A1 | 4/2012 | Sirpal et al. |
| 2012/0081307 A1 | 4/2012 | Sirpal et al. |
| 2012/0081308 A1 | 4/2012 | Sirpal |
| 2012/0081310 A1 | 4/2012 | Schrock |
| 2012/0081316 A1 | 4/2012 | Sirpal et al. |
| 2012/0084673 A1 | 4/2012 | Sirpal et al. |
| 2012/0084678 A1 | 4/2012 | Sirpal et al. |
| 2012/0084679 A1 | 4/2012 | Sirpal et al. |
| 2012/0084680 A1 | 4/2012 | Gimpl et al. |
| 2012/0084690 A1 | 4/2012 | Sirpal et al. |
| 2012/0084700 A1 | 4/2012 | Sirpal et al. |
| 2012/0084725 A1 | 4/2012 | Sirpal et al. |
| 2012/0084735 A1 | 4/2012 | Sirpal |
| 2012/0084736 A1 | 4/2012 | Sirpal |
| 2012/0084737 A1* | 4/2012 | Gimpl et al. ............ 715/863 |

OTHER PUBLICATIONS

International Preliminary Report on Patentability and Written Opinion for International (PCT) Patent Application No. PCT/US2011/053771, mailed Apr. 11, 2013 8 pages.

International Preliminary Report on Patentability for International (PCT) Patent Application No. PCT/US2011/053773, mailed Apr. 11, 2013 12 pages.

International Preliminary Report on Patentability for International (PCT) Patent Application No. PCT/US11/53776, mailed Apr. 11, 2013 7 pages.

International Preliminary Report on Patentability for International (PCT) Patent Application No. PCT/US11/53779, mailed Apr. 11, 2013 6 pages.

International Preliminary Report on Patentability for International (PCT) Patent Application No. PCT/US11/53781, mailed Apr. 11, 2013 7 pages.

International Preliminary Report on Patentability and Written Opinion for International (PCT) Patent Application No. PCT/US2011/052932, mailed Apr. 11, 2013 7 pages.

International Preliminary Report on Patentability and Written Opinion for International (PCT) Patent Application No. PCT/US2011/053032, mailed Apr. 11, 2013 5 pages.

International Preliminary Report on Patentability and Written Opinion for International (PCT) Patent Application No. PCT/US2011/052815, mailed Apr. 11, 2013 6 pages.

International Preliminary Report on Patentability and Written Opinion for International (PCT) Patent Application No. PCT/US2011/052802, mailed Apr. 11, 2013 7 pages.

Official Action for U.S. Appl. No. 13/247,977, mailed Apr. 2, 2013 17 pages.

Official Action for U.S. Appl. No. 13/223,747, mailed May 31, 2013 22 pages.

Official Action for U.S. Appl. No. 13/223,674, mailed Nov. 20, 2012 19 pages.

Final Action for U.S. Appl. No. 13/223,674, mailed Jun. 7, 2013 21 pages.

Official Action for U.S. Appl. No. 13/223,809, mailed May 1, 2013, 17 pages.

Official Action for U.S. Appl. No. 13/223,727, mailed May 14, 2013, 11 pages.

Official Action for U.S. Appl. No. 13/223,697, mailed May 21, 2013, 23 pages.

Official Action for U.S. Appl. No. 12/948,667, mailed Sep. 26, 2012 15 pages.

Final Action for U.S. Appl. No. 12/948,667, mailed May 24, 2013 17 pages.

Official Action for U.S. Appl. No. 12/948,676, mailed Oct. 11, 2012 8 pages.

Final Action for U.S. Appl. No. 12/948,676, mailed May 9, 2013 12 pages.

Official Action for U.S. Appl. No. 12/948,684, mailed Dec. 20, 2012 12 pages.

Final Action for U.S. Appl. No. 12/948,684, mailed Mar. 29, 2013 13 pages.

Bretzner et al., "Hand Gesture Recognition using Multi-Scale Colour Features, Hierarchical Models and Particle Filtering," Proceedings Fifth IEEE Conference on Automatic Face and Gesture Recognition, 2002, pp. 1-6.

Final Action for U.S. Appl. No. 13/247,977, mailed Aug. 1, 2013 22 pages.

Notice of Allowance for U.S. Appl. No. 13/247,822, mailed Oct. 2, 2013, 15 pages.

Official Action for U.S. Appl. No. 12/948,676, mailed Sep. 26, 2013 11 pages.

Official Action for U.S. Appl. No. 12/948,684, mailed Sep. 26, 2013 12 pages.

U.S. Appl. No. 13/629,085, filed Sep. 27, 2012, Reeves et al.

U.S. Appl. No. 13/629,173, filed Sep. 27, 2012, Reeves et al.

"Lapdock™ for Motorola Atrix," at http://www.motorola.com/Consumers/US-EN/Consumer-Product-and-Services/Mobile . . ., accessed Apr. 18, 2011, 1 page.

"Motorola Atrix 4G Laptop Dock Review," at http://www.phonearena.com/reviews/Motorola-ATRIX-4G-Laptop-Dock-Review_id2667, Mar. 2, 2011, 6 pages.

Burns, C., "Motorola Atrix 4G Laptop Dock Review," at http://androidcommunity.com/motorola-atrix-4g-laptop-dock-review-20110220/, Feb. 20, 2011, 5 pages.

Google images, accessed Apr. 18, 2011, 6 pages.

(56) References Cited

OTHER PUBLICATIONS

Harman03, "Kyocera Echo Dual-screen Android Phone," posted 4 weeks from Apr. 18, 2011, 3 pages.
Stein, S., "How does the Motorola Atrix 4G Lapdock compare with a laptop?" Crave-CNET, at http://news.cnet.com/8301-17938_105-20031251-1.html, Feb. 9, 2011, 7 pages.
Catacchio, Chad, "This smartphone has two huge screens. . .that rotate," The Next Web at http://thenextweb.com/asia/2010/10/07/this-smartphone-has-two-huge-screens-that-rotate/, Jul. 21, 2011, 2 pages.
Website entitled, "Sony Tablet," at store.sony.com/webapp/wcs/stores/servlet/CategoryDisplay?catalogId=10551&storeId=10151&la ngId=-1&categoryId=8198552921644795521, 2011, 3 pages.
Website entitled, "Kyocera Echo," at www.echobykyocera.com/, 2011, 6 pages.
International Search Report and Written Opinion for International (PCT) Patent Application No. PCT/US11/53937, mailed Feb. 27, 2012 11 pages.
International Search Report and Written Opinion for International (PCT) Patent Application No. PCT/US2011/053771, mailed Feb. 24, 2012 9 pages.
International Search Report and Written Opinion for International (PCT) Patent Application No. PCT/US2011/053773, mailed Feb. 14, 2012 11 pages.
International Search Report and Written Opinion for International (PCT) Patent Application No. PCT/US11/53776, mailed Feb. 13, 2012 8 pages.
International Search Report and Written Opinion for International (PCT) Patent Application No. PCT/US11/53779, mailed Feb. 13, 2012 7 pages.
International Search Report and Written Opinion for International (PCT) Patent Application No. PCT/US11/53781, mailed Feb. 13, 2012 8 pages.
International Search Report for International (PCT) Patent Application No. PCT/US2011/052932, mailed Apr. 27, 2012 3 pages.
International Search Report for International (PCT) Patent Application No. PCT/US2011/053032, mailed Apr. 27, 2012 3 pages.
International Search Report for International (PCT) Patent Application No. PCT/US2011/052815, mailed Apr. 27, 2012 3 pages.
International Search Report for International (PCT) Patent Application No. PCT/US2011/052802, mailed Apr. 27, 2012 4 pages.
Final Action for U.S. Appl. No. 13/223,747, mailed Dec. 18, 2013 22 pages.
Final Action for U.S. Appl. No. 13/223,809, mailed Nov. 20, 2013, 20 pages.
Final Action for U.S. Appl. No. 13/223,727, mailed Nov. 20, 2013, 13 pages.
Final Action for U.S. Appl. No. 13/223,697, mailed Dec. 2, 2013, 23 pages.
Official Action for U.S. Appl. No. 13/247,977, mailed Mar. 26, 2014 17 pages.
Official Action for U.S. Appl. No. 13/223,697, mailed Apr. 1, 2014, 23 pages.
Final Action for U.S. Appl. No. 12/948,676, mailed Apr. 24, 2014 15 pages.
Official Action for U.S. Appl. No. 12/948,684, mailed May 9, 2014 8 pages.

* cited by examiner

SYSTEMS AND METHODS FOR RECEIVING GESTURE INPUTS SPANNING MULTIPLE INPUT DEVICES

BACKGROUND

As the computing and communication functions of handheld computing devices become more powerful, the user interface and display elements of such devices have evolved by attempting to adapt user interface regimes developed for personal computers for use with handheld computing devices. However, this attempt to adapt prior user interface regimes has been met with various hurdles.

For instance, the majority of current handheld computing devices make use of a physical keypad for user interface. Many different implementations of physical keypads exist that vary in orientation and relationship to the device screen. However, in every case the physical keypads take up a certain percentage of the physical space of the device and increase the weight of the device. In addition to the disadvantages of size and weight, physical keypads are not configurable in the same manner as a touch screen based user interface. While certain limited forms of physical keypads currently have, on the keys themselves, configurable displays, such as elnk or OLED surfaces that allow for reconfiguration of the keys, even in these cases the physical layout of keys is not modifiable. Rather, only the values associated with the physical keys on the keypad may be changed.

Other methods may provide increased user configurability of physical keypads. These methods may include stickers and/or labels that can be added to keys to reference modified functions or plastic overlays on top of the keypad denoting different functional suites. For instance, the ZBoard keyboard, meant for laptop or desktop computer use, incorporates a dual layered physical keyboard which separates the keys and their layout from the connections which send signals to the machine. As such, different physical keyboard inserts for different applications can be inserted into a holder allowing full configurability such that the orientation and layout of the keys in addition to their denotation of function is configurable. This model could be extended to handheld computing devices; however, the rate at which such a modular keypad can change functions is much slower than a touch screen user interface. Furthermore, for each potential functional suite, an additional physical key layout must be carried by the user, greatly increasing the overall physical size and weight of such implementations. One advantage of a physical keypad for handheld computing devices is that the user input space is extended beyond the display space such that none of the keys themselves, the housing of the keys, a user's fingers, or a pointing device obscure any screen space during user interface activities.

A substantial number of handheld computing devices make use of a small touch screen display to deliver display information to the user and to receive inputs from the user. In this case, while the configurability of the device may be greatly increased and a wide variety of user interface options may be available to the user, this flexibility comes at a price. Namely, such arrangements require shared screen space between the display and the user interface. While this issue is shared with other types of touch screen display/user interface technology, the small form factor of handheld computing devices results in a tension between the displayed graphics and area provided for receiving inputs. For instance, the small display further constrains the display space, which may increase the difficulty of interpreting actions or results while a keypad or other user interface scheme is laid overtop or to the side of the applications in use. Accordingly, the application is squeezed into an even smaller portion of the display. Thus a single display touch screen solution, which solves the problem of flexibility of the user interface may create an even more substantial set of problems of obfuscation of the display, visual clutter, and an overall conflict of action and attention between the user interface and the display.

Single display touch screen devices thus benefit from user interface flexibility, but may be crippled by their limited screen space such that when users are entering information into the device through the display, the ability to interpret information in the display can be severely hampered. This problem is exacerbated in several key situations when complex interaction between display and interface is required, such as when manipulating layers on maps, playing a game, or modifying data received from a scientific application. This conflict between user interface and screen space severely limits the degree to which the touch screen based user interface may be used in an intuitive manner. As such, it may be advantageous to provide multiple touch screen displays on a handheld computing device to overcome the above noted issues known regarding providing a single touch screen display.

Touch screen displays may also be used to receive gesture inputs to assist in controlling functions associated with devices. While touch sensitive technologies have been developed that are operable to recognize multiple touch inputs simultaneously on a single touch screen, a device that includes more than one touch screen display remains limited to receiving gesture inputs that are isolated to a single one of the multiple touch screen displays. As such, the functionality of such devices may be limited.

SUMMARY

A first aspect includes a method for operating a handheld computing device. The method includes receiving an input event at one of a plurality of input devices, generating location data that describes the input event including an identification of the input device that received the input event and a location of the input event on the input device receiving the input event, and translating the location to a global virtual space location in a global virtual space.

A number of feature refinements and additional features are applicable to the first aspect. These feature refinements and additional features may be used individually or in any combination. As such, each of the following features that will be discussed may be, but are not required to be, used with any other feature or combination of features of the first aspect.

In one embodiment, the plurality of input devices may include touch screen displays. In turn, the method may further include executing an application on the handheld computing device that is displayed in at least one of the plurality of touch screen displays. The application may have a location defined in the global virtual space. The method may also include sending the global virtual space location to the application. The sending may at least partially depend on the location of the application within the global virtual space. For example, if the application occupies the entire global virtual space, the global virtual space location may be unmodified as compared to the location with respect to a single one of the touch screen displays. Alternatively, if the application occupies less than the entire global virtual space, the global virtual space location is downscaled based on a portion of global virtual space which is occupied by the application.

In additional embodiments, the relative location of the applications with respect to the global virtual display may be maintained by a window manager service. The plurality of input devices may be physically separated on the handheld computing device. However, the global virtual space may include a continuous representation of the plurality of input devices. As such, the physical arrangement of the plurality of input devices may be mimicked in the global virtual space.

A second aspect includes a method for receiving a gesture input spanning a first input device and a second input device. The method includes detecting a first gesture initiation event. Additionally, the method includes receiving motion events related to the first gesture initiation event. The method also includes sensing a first gesture termination event. The method also includes detecting a second gesture initiation event. The method additionally includes determining if the first gesture termination event and the second gesture initiation event include portions of a unitary touch gesture spanning the first input device and the second input device at least partially based on one or more characteristics of at least one of the first gesture termination event, the second gesture initiation event, or the motion events.

A number of feature refinements and additional features are applicable to the second aspect. These feature refinements and additional features may be used individually or in any combination. As such, each of the following features may be, but are not required to be, used with any other feature or combination of features of the second aspect.

In one embodiment, if the first gesture termination event and the second gesture initiation event are determined to include portions of a unitary touch gesture spanning the first input device and second input device, the first gesture termination event and second gesture initiation event are not sent to an application executing on the handheld computing device. Furthermore, if the first gesture termination event and the second gesture initiation event are not determined to include portions of a unitary touch gesture spanning the first input device and second input device, the first gesture termination event and second gesture initiation event are sent to an application executing on the handheld computing device.

In another embodiment, the determining operation may include ascertaining whether a termination location of the first gesture termination event is within a threshold distance to an edge of the first input device adjacent to the second input device. Furthermore, the determining operation may include ascertaining whether an initiation location of the second gesture initiation event is within a threshold distance to an edge of the second input device adjacent to the first input device. Further still, the determining operation may include includes analyzing the motion events preceding the first gesture termination event with regard to at least one of a direction of travel, a speed, or an acceleration of the motion events.

In another embodiment, the determining operation may include comparing the first gesture termination event and the second gesture initiation event to determine if the events were received at different input devices. Accordingly, the determining operation may also include postponing the release of the first gesture termination event to an application for a pending period. The pending period may be determined based on at least one of the location of the first gesture termination event to the edge of the first input device, a distance between the first input device and the second input device, the threshold distance, or the speed of the motion events.

In another embodiment, the determining operation may further include maintaining a count of the number of gesture initiation events. Receipt of a gesture initiation may increase the count by one, and receipt of a gesture termination event decreases the count by one. As such, a gesture initiation event that results in the count being greater than one may not be sent to the application, and a gesture termination event that results in the count being greater than zero may not be sent to the application.

DETAILED DESCRIPTION

The present disclosure is generally related to gesture inputs for interaction with a computing device. The systems and methods presented herein are particularly suited for control of devices that have more than one input device capable of receiving user inputs (e.g., a device with more than one touch screen display). The following disclosure may, in various embodiments, be applied to other computing devices capable of displaying and responding to a GUI (e.g., laptop computers, tablet computers, desktop computers, touch screen monitors, etc.) and is not intended to be limited to handheld computing devices unless otherwise explicitly specified.

Figure 1:
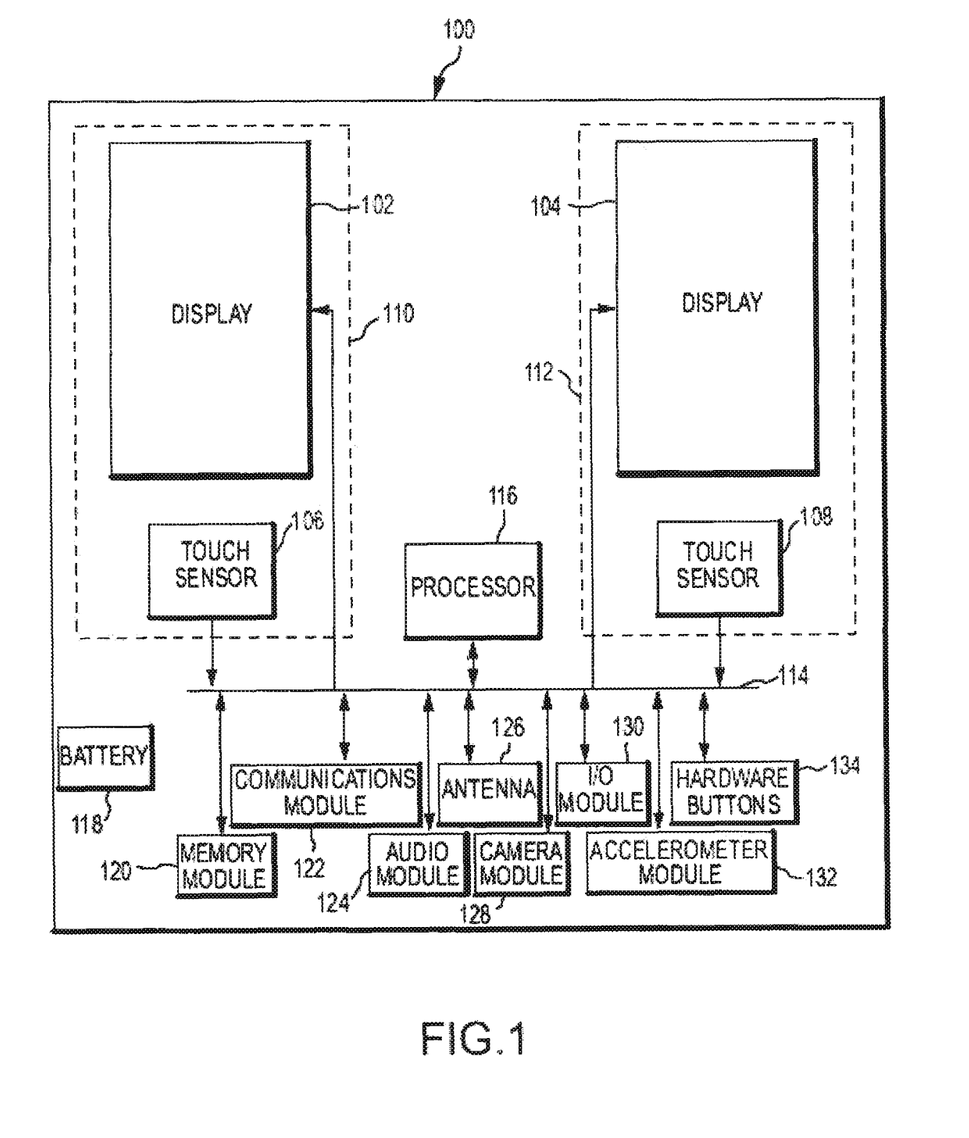
FIG. 1 is a schematic view of an embodiment of a handheld computing device.

FIG. 1 schematically depicts an embodiment of a handheld computing device 100. The handheld computing device 100 may include a first display 102 and a second display 104. While two displays (102, 104) may be shown and described, a handheld computing device may be provided that includes one or more displays.

The handheld computing device 100 may be configurable between a first position and a second position. In the first position, a single display may be visible from the perspective of a user. While both displays may be exposed on an exterior of the handheld device 100 when in the first position, the displays may be arranged in a non-adjacent manner such that only one of the displays is visible by a user at any given time (e.g., one display may be visible from the front of the device 100 and the other display may be visible from the back of the device 100).

The handheld computing device 100 may also be provided in the second position such that the displays may be concurrently visible from the perspective of a user. For example, the displays 102, 104 may be displayed in the second position such that the displays 102, 104 are arranged end-to-end or side-by-side. In this regard, the displays 102, 104 may have adjacent edges separated by a seam, discontinuity, or the like.

Additionally, the displays 102, 104 may be arranged in a portrait orientation or a landscape orientation with respect to a user. A portrait orientation is intended to describe an arrangement of a display, wherein the longer dimension of the display is vertically oriented (e.g., with respect to gravity or the perspective of a user). A landscape orientation is intended to describe an arrangement wherein the shorter dimension of a display is vertically oriented (e.g., with respect to gravity or the perspective of a user). The longer dimension and shorter dimension may refer to each display individually or the combined viewing area of the one or more displays of the device. Thus, when the individual displays are arranged in a portrait orientation, the overall display area may be arranged in a landscape orientation, and vice versa.

The handheld computing device 100 may be manipulated between the first position and the second position in a variety of manners. For instance, the device 100 may include a slider mechanism such that the first and second displays 102, 104 are disposable adjacent to one another in a parallel fashion when in the second position and slideable to the first position where only a single display is viewable and the other display is obscured by the viewable display.

Alternatively, the device 100 may be arranged in a clam shell type arrangement wherein a hinge is provided between the first display 102 and the second display 104 such that the displays 102, 104 are concurrently visible by a user when in the second position (i.e., an open position). The displays 102, 104 may be provided on an interior clam shell portion or an exterior clam shell portion of the device 100. As such, in the latter instance both displays 102, 104 may be visible from the front and the back of the device, respectively, when the device is in the first position (i.e., the closed position). When the device 100 is in the open position, the displays 102, 104 may be provided adjacent and parallel to one another. Alternative arrangements of the handheld computing device 100 are contemplated wherein different arrangements and/or relative locations of the displays may be provided when in the first and second position.

In addition, the first display 102 and the second display 104 may be provided as entirely separate devices. In this regard, a user may manipulate the displays 102, 104 such that they may be positioned adjacent to one another (e.g., side-by-side or end-to-end). The displays 102, 104 may be in operative communication when adjacently positioned such that the displays 102, 104 may operate in the manner provided below when adjacently positioned (e.g., via physical contacts, wireless communications, etc.). A retention member (not shown) may be provided to retain the separate displays 102, 104 in an adjacent position. For instance, the retention member may include coordinating magnets, mechanical clips or fasteners, elastic members, etc. In any regard, the first display 102 may be separated from the second display 104 by sensitivity discontinuity (e.g., a seam).

While the foregoing has referenced two displays 102 and 104, alternate embodiments of a handheld device may include more than two displays. In this regard, the two or more displays may behave in a manner in accordance with the foregoing wherein only a single display is viewable by a user in a first position and more than two displays are viewable in a second position. Additionally, in one embodiment, the two displays 102 and 104 may include separate portions of a unitary display. As such, the first display 102 may be a first portion of the unitary display and the second display 104 may be a second portion of the unitary display. For instance, the handheld computing device 100 (e.g., having a first and second display 102 and 104) may be operatively connected to the unitary display (e.g., via a connector or a dock portion of the unitary display) such that the first display 102 and the second display 104 of the handheld computing device 100 are emulated on the unitary display. As such, the unitary display may have first and second portions corresponding to and acting in a similar manner to the first and second display 102 and 104 of the handheld computing device 100 described below.

The handheld computing device 100 may further include multiple input devices that may be used to receive user inputs. These input devices may be operative to receive gesture inputs from a user, and, accordingly, may be referred to generally as gesture sensors. A number of different types of gesture sensors may be provided. Some examples include, but are not limited to traditional input devices (keypads, trackballs, etc.), touch sensitive devices, optical sensors (e.g., a camera or the like), or other appropriate input devices. The discussion contained herein may reference the use of touch screen devices to receive gesture inputs. However, the use of touch screen devices is not intended to limit the means for receiving gesture inputs to touch screen devices alone and is provided for illustrative purposes only. Accordingly, any of the foregoing means for receiving a gesture input may be used to produce the functionality disclosed below.

In the particular embodiment depicted in FIG. 1, the handheld computing device 100 includes a first touch sensor 106. Furthermore, the handheld computing device 100 includes a second touch sensor 108. The first touch sensor 106 and/or the second touch sensor 108 may be touchpad devices, touch screen devices, or other appropriate touch sensitive devices. Examples include capacitive touch sensitive panels, resistive touch sensitive panels, or devices employing other touch sensitive technologies. The first touch sensor 106 and/or second touch sensor 108 may be used in conjunction with a portion of a user's body (e.g., finger, thumb, hand, etc.), a stylus, or other acceptable touch sensitive interface mechanisms known in the art. Furthermore, the first touch sensor 106 and/or the second touch sensor 108 may be multi-touch devices capable of sensing multiple touches simultaneously.

The first touch sensor 106 may correspond to the first display 102 and the second touch sensor 108 may correspond to the second display 104. In one embodiment of the handheld computing device 100, the first display 102 and the first touch sensor 106 includes a first touch screen display 110. In this regard, the first touch sensor 106 may be transparent or translucent and positioned with respect to the first display 102 such that a corresponding input received at the first touch sensor 106 may be correlated to the first display 102 (e.g., to interact with a screen rendered on the first display 102). Similarly, the second display 104 and the second touch sensor 108 may include a second touch screen display 112. In this regard, the second touch sensor 108 may be positioned with respect to the second display 104 such that an input received at the second touch sensor 108 may be correlated to the second display 104 (e.g., to interact with a screen rendered on the second display 104). Alternatively, the first touch sensor 106 and/or the second touch sensor 108 may be provided separately from the displays 102, 104.

In this regard, the first and second touch sensors 106, 108 may have substantially the same footprint on the handheld computing device 100 as the displays 102, 104. Alternatively, the touch sensors 106, 108 may have a footprint including less of the entirety of the displays 102, 104. Further still, the touch sensors 106, 108 may include a footprint that extends beyond the displays 102, 104 such that at least a portion of the touch sensors 106, 108 are provided in non-overlapping relation with respect to the displays 102, 104. As discussed further below, the touch sensors 106, 108 may alternatively be provided in complete non-overlapping relation such that the footprint of the touch sensors 106, 108 is completely different than the footprint of the displays 102, 104.

The handheld computing device 100 may further include a processor 116. The processor 116 may be in operative communication with a data bus 114. The processor 116 may generally be operative to control the functionality of the handheld device 100. For instance, the processor 116 may execute an operating system and be operative to execute applications. The processor 116 may be in communication with one or more additional components 120-134 of the handheld computing device 100 as will be described below. The processor 116 may be in direct communication with one more of the additional components 120-134 or may communicate with the one or more additional components 120-134 via the data bus 114.

Furthermore, while the discussion below may describe the additional components 120-134 being in operative communication with the data bus 114, in other embodiments, any of the additional components 120-134 may be in direct operative communication with any of the other additional components 120-134. The processor 116 may be operative to independently control the first display 102 and the second display 104 and may be operative to receive input from the first touch sensor 106 and the second touch sensor 108. The processor 116 may include one or more different processors. For example, the processor 116 may include one or more application specific integrated circuits (ASICs), one or more field-programmable gate arrays (FPGAs), one or more general purpose processors operative to execute machine readable code, or any combination of the foregoing.

The handheld computing device may include a battery 118 operative to provide power to the various devices and components of the handheld computing device 100. In this regard, the handheld computing device 100 may be portable.

The handheld computing device 100 may further include a memory module 120 in operative communication with the data bus 114. The memory module 120 may be operative to store data (e.g., application data). For instance, the memory 120 may store machine readable code executable by the processor 116 to execute various functionalities of the device 100.

Additionally, a communications module 122 may be in operative communication with one or more components via the data bus 114. The communications module 122 may be operative to communicate over a cellular network, a Wi-Fi connection, a hardwired connection or other appropriate means of wired or wireless communication. The handheld computing device 100 may also include an antenna 126. The antenna 126 may be in operative communication with the communications module 122 to provide wireless capability to the communications module 122. Accordingly, the handheld computing device 100 may have telephony capability (i.e., the handheld computing device 100 may be a smartphone device).

An audio module 124 may also be provided in operative communication with the data bus 114. The audio module 124 may include a microphone and/or speakers. In this regard, the audio module 124 may be able to capture audio or produce sounds. Furthermore, the device 100 may include a camera module 128. The camera module 128 may be in operative communication with other components of the handheld computing device 100 to facilitate the capture and storage of images or video.

Additionally, the handheld computing device 100 may include an I/O module 130. The I/O module 130 may provide input and output features for the handheld computing device 100 such that the handheld computing device 100 may be connected via a connector or other device in order to provide syncing or other communications between the handheld computing device 100 and another device (e.g., a peripheral device, another computing device etc.).

The handheld computing device 100 may further include an accelerometer module 132. The accelerometer module 132 may be able to monitor the orientation of the handheld computing device 100 with respect to gravity. In this regard, the accelerometer module 132 may be operable to determine whether the handheld computing device 100 is substantially in a portrait orientation or landscape orientation. The accelerometer module 132 may further provide other control functionality by monitoring the orientation and/or movement of the handheld computing device 100.

The handheld computing device 100 may also include one or more hardware buttons 134. The hardware buttons 134 may be used to control various features of the handheld computing device 100. The hardware buttons 134 may have fixed functionality or may be contextual such that the specific function of the buttons changes during operation of the handheld computing device 100. Examples of such hardware buttons may include, but are not limited to, volume control, a home screen button, an end button, a send button, a menu button, etc.

Figure 2A:
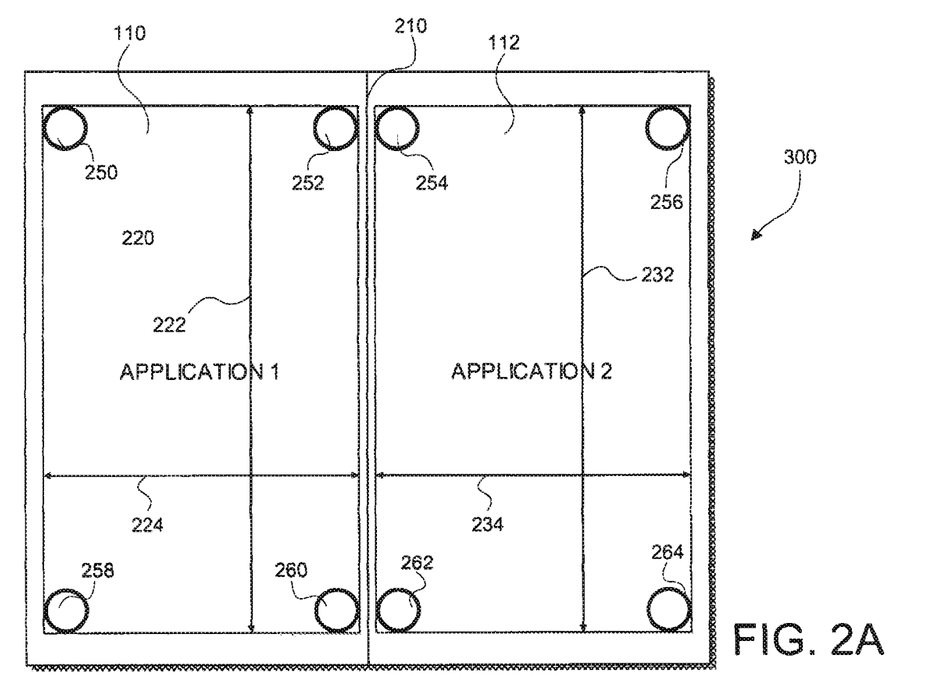
FIG. 2A is a front view of an embodiment of a handheld computing device.

FIG. 2A further depicts one particular embodiment of the handheld computing device 100. The device 100 includes a first touch screen display 110 and a second touch screen display 112. The touch screen displays include touch sensitive capabilities to detect inputs received on the display when a user touches the display. The first touch screen display 110 and the second touch screen display 112 may be arranged on the device such that a seam 210 extends between adjacent edges of the displays. The seam 210 may be virtual or physical. Furthermore, the seam 210 may be of zero width. That is, the seam 210 may consist of only a discontinuity of the touch sensitive portions of the display (e.g., where two touch screen displays are abutted without any gap there between). As such, touch inputs received on different respective sides of the seam 210 may be registered independently. In conjunction with the foregoing, the seam 210 may be provided with a hinge to facilitate positioning of the device between a first position and a second position as discussed above. Alternatively, the seam 210 may exist as a result of a sliding mechanism or any other discontinuity between the first touch screen display 110 and the second touch screen display 112. In any regard, the seam 210 may lack touch sensitivity and represent a discontinuity between the independent displays.

The first touch screen display 110 has a height 222 and a width 224. The height 222 and width 224 may be measured in pixels. In one embodiment the height 222 of the first touch screen display 110 may be 800 pixels and the width 224 of the first touch screen display 110 may be 480 pixels. These values are used for exemplary purposes only and other values may be used without departing from the scope of the present disclosure. In a similar manner, the second touch screen display 112 has a height 232 and a width 234. Again, the height 232 may be 800 pixels and the width 234 may be 480 pixels. The first touch screen display 110 and the second touch screen display 112 may each be independent pieces of hardware having independent drivers operative to independently interpret inputs from a respective display.

Figure 3:
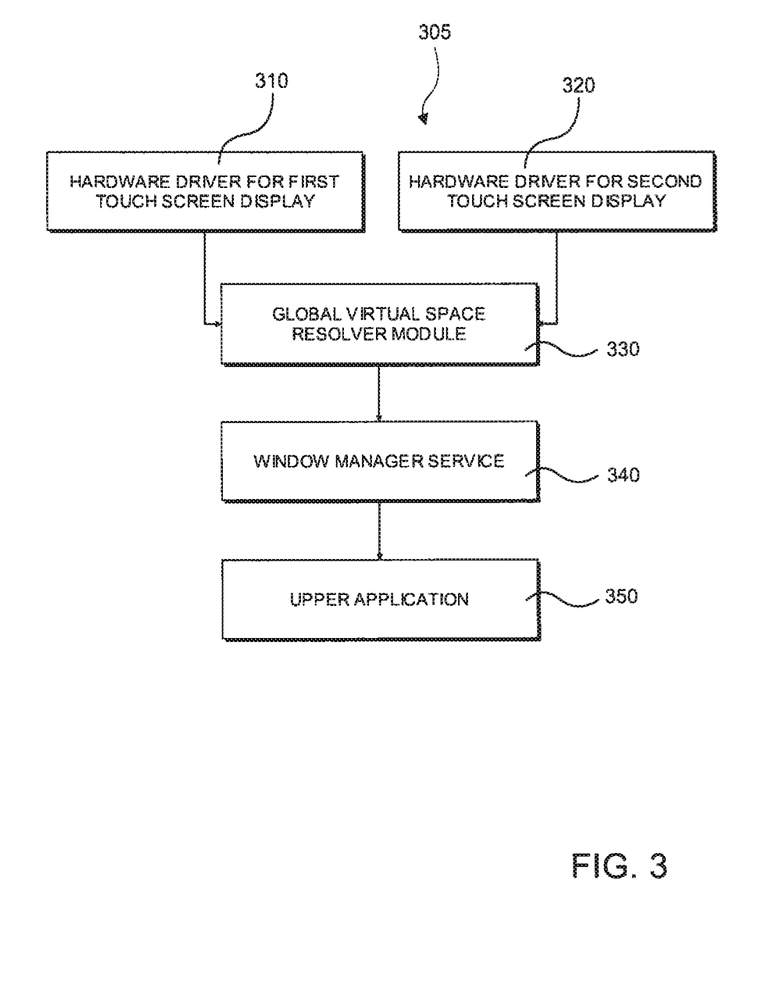
FIG. 3 is a schematic view of an embodiment of a system framework.

With additional reference to FIG. 3, an embodiment of a system framework 305 is shown that includes two independent hardware drivers 310 and 320. A first hardware driver 310 corresponding to the first touch screen display 110 and a second hardware driver 320 corresponding to the second touch screen display 112 may be provided. These hardware drivers 310 and 320 may independently provide location information associated with an input received at a respective one of the touch screen displays. This location information for each independent hardware device may be provided to a global virtual space translation module 330. The global virtual space translation module 330 may in turn provide location information to a window manager service 340. The window manager service 340 may then provide location data to an upper application 350 executing on the device. The interaction of the window manager service 340 and upper application 350 is discussed further below. The drivers 310 and 320, the global virtual space translation module 330, and the window manager service 340 may be hardware, software, firmware, or any combination thereof operable to perform in a manner in accord with the present disclosure.

Figure 2B:
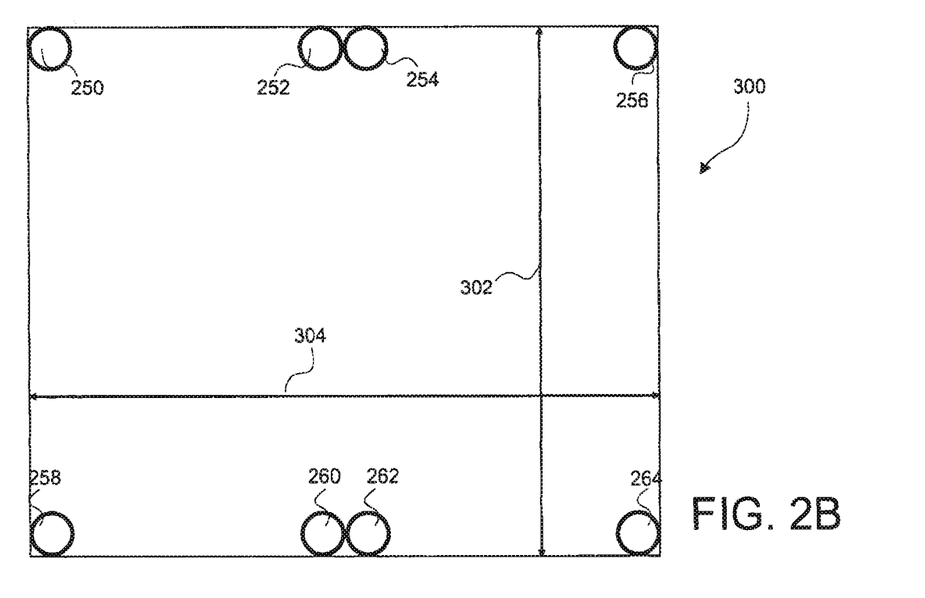
FIG. 2B is a graphical representation of a global virtual space of the embodiment shown in FIG. 2A.

With additional reference to FIG. 2B, a graphical representation of an embodiment of a global virtual space 300 for the handheld computing device 100 is shown. The term "global virtual space" references a virtual representation of the combined display and input receiving areas of the first touch screen display 110 and the second touch screen display 112. The global virtual space 300 may be an entirely virtual construct stored in a memory module 120 of the handheld computing device 100. Note that while in the physical embodiment of the device 100 the first touch screen display 110 and second touch screen display 112 are separated by a seam 210, the global virtual space 300 may be a continuous, uninterrupted virtual representation of a collective display and input receipt area including the individual display and input receiving areas of the first touch screen display 110 and the second touch screen display 112. The global virtual space 300 may include a height 302 substantially the same as the first touch screen display 110 and second touch screen display 112. In this regard, the height 302 of the global virtual space 300 may be 800 pixels. The width 304 of the global virtual space 300 may be the combined width 224 and 234 of the first touch screen display 110 and the second touch screen display 112. As such, the width 304 of the global virtual space 300 may be 960 pixels.

The use of a global virtual space 300 may allow the handheld computing device 100 to interpret inputs received at the separate independent touch screen displays 110, 112 as inputs received with respect to a unitary display and input receipt area. In this regard, an application executing on the device 100 that is designed to operate on a single display and receive inputs from a single input device may execute on the device 100 without modification. Events may be passed to and received from the application which reference the global virtual space 300. As such, it may appear to the application as though a unitary display and input receipt area exists on the device, when in reality independent hardware devices may be provided.

As referenced above, the global virtual space 300 may be a composite of the display and input receipt areas of the first touch screen display 110 and the second touch screen display 112. In contrast to the physical embodiment wherein the first touch screen display 110 and second touch screen display 112 are separated by non-touch sensitive seam 210, the global virtual space 300 may be a unitary composite of the display and input receipt areas of the first and second touch screen displays 110 and 112. The physical locations of the first and second touch screen displays 110 and 112 may be mimicked in the global virtual space 300. That is, the relative locations of the first and second touch screen displays 110 and 112 may be maintained in the global virtual space 300.

The first touch screen display 110 and second touch screen display 112 may be used to receive a number of touch inputs 250-264. Upon receipt of each of the touch inputs 250-264 on the independent touch screen displays 110 and 112, the corresponding hardware driver 310 or 320 may pass the location information associated with the touch input 250-264 on to the global virtual space translation module 330. The global virtual space translation module 300 may translate the location of the touch input to a location within the global virtual space 300. When describing the physical representation of the device 100, a location will be described with reference to the touch screen display on which the input was received and the location of the touch input in that display. This location on the display is described by a coordinate system with a general description of (number of pixels from left edge of the touch screen display, number of pixels from the top edge of the touch screen display). Locations within the global virtual display may be described with a coordinate system with a general description of (number of pixels from left edge of the global virtual space, number of pixels from the top edge of the global virtual display).

As further example, touch input 250 may be received at location (1,1) on the first touch screen display 110. When translated into global virtual space 300, touch input 250 may have a translated location (1,1). Touch input 252 is received at location (479,1) on the first touch screen display 110. The corresponding global virtual space location for touch input 252 may be (479,1). In this regard, as the first touch screen display 110 is the leftmost touch screen of the device 100, the location data may not change when translated to the global virtual space 300 because the display and input receipt area of the first touch screen display 110 also includes the leftmost position in the global virtual space 300.

Touch input 254 may have a location (1,1) on the second touch screen display 112. When translated into global virtual space 300, touch input 254 may have a location (481,1). As such, the location of touch input 254 is translated to account for the fact that touch input 254 is received in the second display 104. As the display and input receipt areas of the second display are offset in global virtual space 300 by a distance corresponding to display and input receipt areas of the first touch screen display 110, locations associated with the second touch screen display 112 may be offset in global virtual space 300. In a similar regard, touch input 256 may have a location (479,1) on the second touch screen display 112. When translated into the global virtual space 300, the touch input 256 may have a location (959,1).

This pattern continues with touch input 258, which may have a location (1,799) on the first touch screen display 110. The location of the touch input 258 may be translated to location (1,799) in the global virtual space 300. Touch input 260 may have a location (479,799) on the first touch screen display 110. This may be translated to a location (479,799) in the global virtual space 300. Touch input 262 having a location (1,799) on the second display 104 may be translated to have a location (481,799) in the global virtual space 300. Touch input 264 may have a location (479,799) on the second display 104. This may be translated to a global virtual space location of (959,799). In this regard, each of the touch inputs 250-264 may be translated to have global virtual space locations as shown in FIG. 2B. While the foregoing included specific examples, touch inputs received anywhere on either the first touch screen display 110 or the second touch screen display 112 may be translated into global virtual space 300 in a similar manner as that described above.

As further depicted in FIG. 3, the global virtual space translation module 330 which translates individual inputs received from hardware drivers 310 and 320 into global virtual space 300 may in turn provide these global virtual space locations to a window manager service 340. The window manager service 340 may include information regarding the position of one or more graphics associated with one or more applications executing on the device 100. As such, the window manager service 340 may track whether one or more graphics associated with an application are being displayed in the first and second display 102 and 104, only the first display 102, or only the second display 104. In turn, the applications executing on the device 100 may have different reference frames with regard to the global virtual space 300. In turn, the window manager service 340 may provide upscaled or downscaled location information for an input location to the upper application 350 depending upon how the upper application 350 is displayed.

For example, as shown in FIG. 2A, application 1 220 and application 2 230 may be executing on the device 100 in a respective one of the first touch screen display 110 and the second touch screen display 112. As such, the window service manager 340 may provide appropriate location information to one or both of the applications based on where and in which input device an input is received. While not shown, a single application may execute so that the single application is displayed on both the first display 102 and the second display 104 as if the two displays were a unitary display. Table 1 below describes how the physical location is mapped by the window manager service 340 to applications depending upon the nature and orientation of the applications in the display.

initiation of the gesture (e.g., such as a user putting their finger down on a touch screen display). The device may then track the motion of the input (e.g., as a user moves their finger along the touch screen device without lifting the finger from the device). The data corresponding to this motion of a touch input may be referred to as motion events. These motion events may be recorded and include, for example, the location, speed, and/or acceleration of the movement. Further still, a gesture termination event, which may be referred to as an up event coincides with the termination of the input (e.g., when a user lifts their finger up from the touch screen display). In one embodiment, a gesture may be provided wherein the user attempts to use both independent touch screen displays to input a single gesture. This may present an issue as the independent touch screen displays may be separated by a seam lacking touch sensitivity. In turn, a portion of the gesture spanning the touch screen displays cannot be tracked and may lead to erroneous gesture termination and gesture initiation events.

Figure 4:
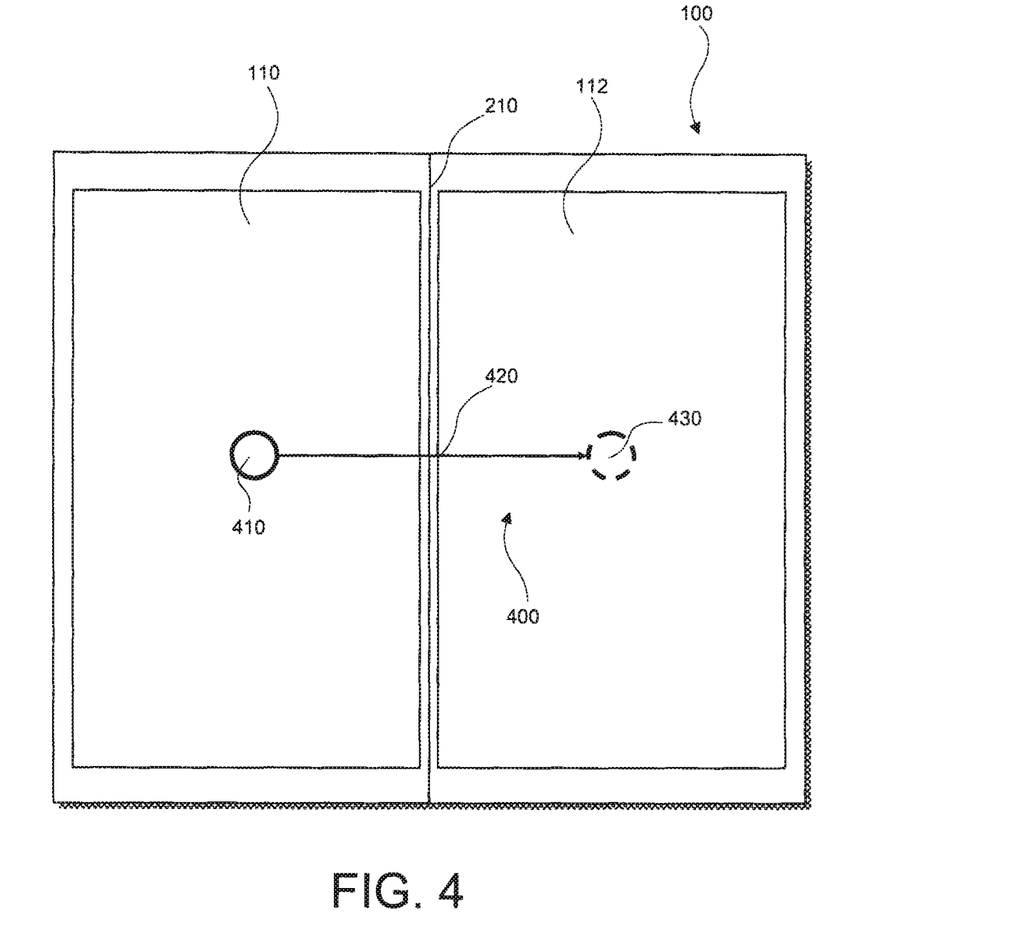
FIG. 4 is a graphical representation of an intended gesture input that spans multiple independent input devices.

For example, with additional reference to FIG. 4 a gesture input 400 which a user intends to input is shown. The gesture input 400 originates at the first touch screen display 110 with a down event 410, includes motion events corresponding to

TABLE 1

| Physical coordinate and display | Global virtual space coordinate | Single-screen application running on first touch screen display 110 | Single-screen application running on second touch screen display 112 | Dual-screen application running on both touch screen displays 110 and 112 |
| --- | --- | --- | --- | --- |
| (1, 1) on first touch screen display 110 | (1, 1) | (1, 1) | (−479, 1) | (1, 1) |
| (1, 1) on second touch screen display 112 | (481, 1) | (481, 1) | (1, 1) | (1, 1) |
| (479, 1) on first touch screen display 110 | (479, 1) | (479, 1) | (−1, 1) | (479, 1) |
| (479, 1) on second touch screen display 112 | (959, 1) | (959, 1) | (479, 1) | (959, 1) |
| (1, 799) on first touch screen display 110 | (1, 799) | (1, 799) | (−479, 799) | (1, 799) |
| (1, 799) on second touch screen display 112 | (481, 799) | (481, 799) | (1, 799) | (481, 799) |
| (479, 799) on first touch screen display 110 | (479, 799) | (479, 799) | (−1, 799) | (479, 799) |
| (479, 799) on second touch screen display 112 | (959, 799) | (959, 799) | (479, 799) | (959, 799) |

As such, the global virtual space translation module 330 and the use of global virtual space 300 may allow applications to execute on a respective one of the displays or the application may span both the displays. As the global virtual space translation module 330 and the window manager service 340 provides appropriate location data for inputs received depending upon the nature and position of the display, the fact that separate independent displays are used may be transparent to the upper application 350.

Additional functionality of a device may also be provided upon the receipt of gesture inputs. A gesture input may include a gesture initiation event. A gesture initiation event may be referred to as a down event and coincide with the motion 420 of the gesture, and an up event 430 on the second display 104. In this regard, the motion 420 spans the seam 210, which lacks touch sensitivity. As such, motion over the seam 210 may not be detected by the device.

Figure 5:
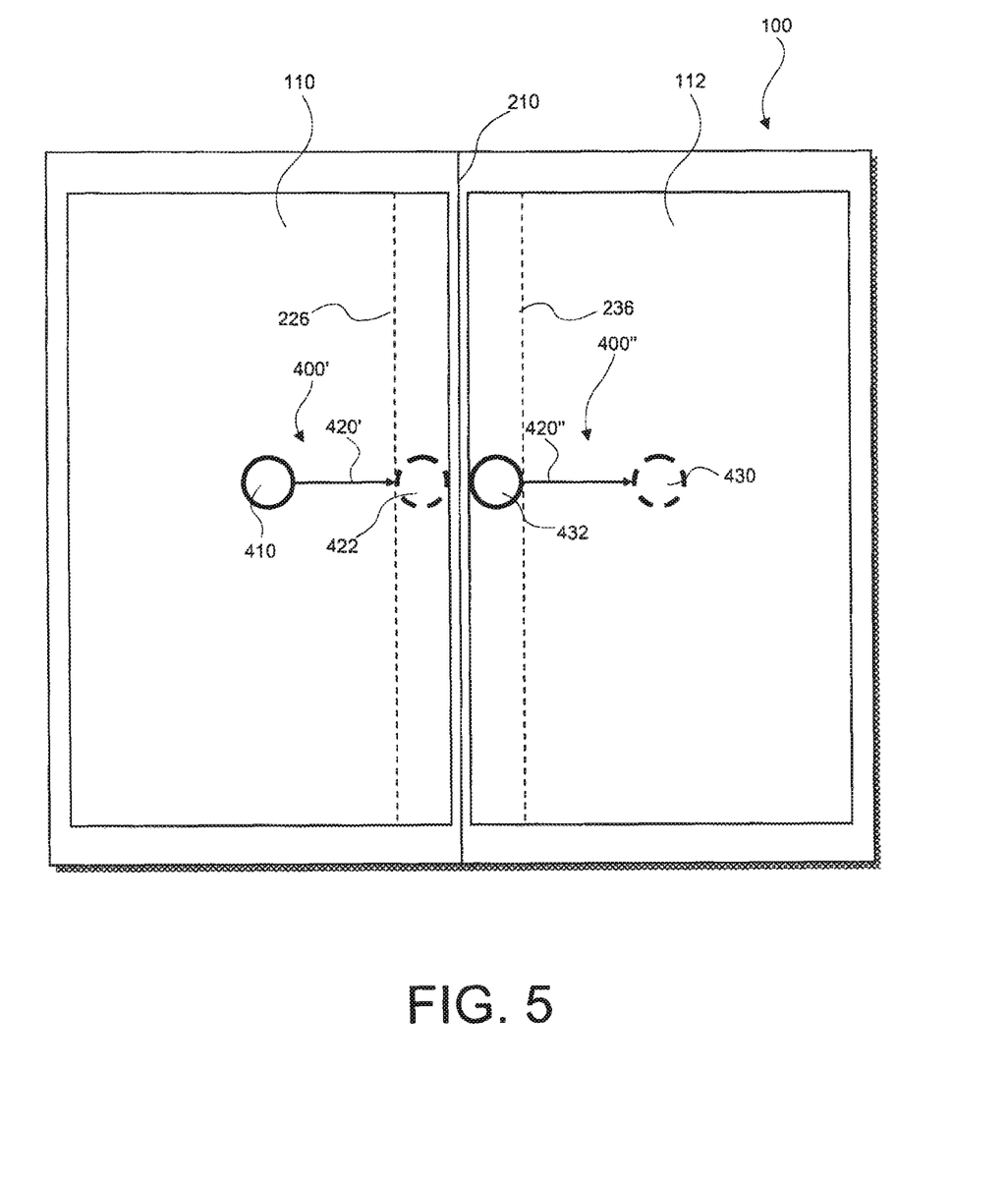
FIG. 5 is a graphical representation of the gesture input shown in FIG. 4 as sensed by the embodiment of the handheld computing device.

In turn, the gesture may actually be interpreted by the device 100 as shown in FIG. 5. In FIG. 5, the data produced by the independent hardware drivers may also include an up event 422 received as the user's finger transitions from the first touch screen display 110 to the seam 210, and a subsequent down event 432 as the user's finger transitions from the seam 210 to the second touch screen display 112. As such, rather than a unitary gesture 400 spanning the first touch screen display 110 and the second touch screen display 112, the device may register a first gesture 400' including a down event 420, first motion 420', and up event 422 as well as a second gesture 400" including a down event 432, second motion 420" and an up event 430. As such, while the user may desire to input a gesture spanning the two displays as shown in FIG. 4, two separate gestures directed to each individual touch screen display may in fact be received by the device 100 as shown in FIG. 5.

In turn, the present disclosure may provide a process by which such gestures are deciphered and provided to an upper application as a unitary gesture rather than separate gestures on individual displays. For example, the process may be executed by the global virtual space translation module 330 as shown in FIG. 3. In one embodiment, such a process may be divided into portions, one of which executes upon receipt of an up event and another which executes upon receipt of a down event. Such processes are graphically depicted in flow-charts in FIGS. 6 and 7, respectively.

Figure 6:
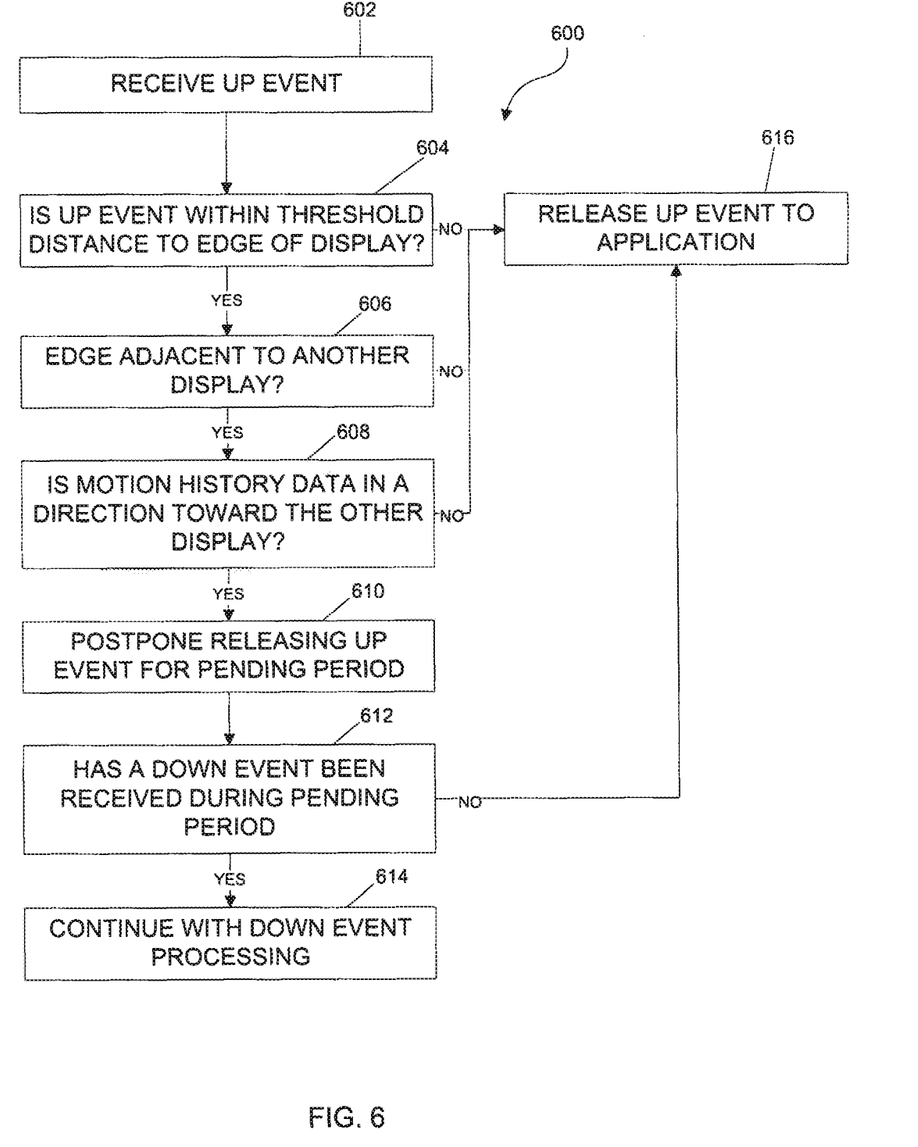
FIG. 6 is a flowchart depicting a portion of an embodiment of a process that may facilitate receipt of a gesture input that spans multiple input devices.

An up event process 600 may include receipt 602 of an up event 422. The up event 422 is then analyzed 604 to determine if the location of the up event 422 is within a threshold distance 226 from the edge of the display 110. Threshold distances 226 and 236 are graphically represented in FIG. 5 with respect to the first touch screen display 110 and second touch screen display 112. The threshold distances 226 and 236 may be spaced apart from edges of the touch screen displays. Edges of the displays separated by the seam 210 may include these threshold distances 226 and 236. Alternatively or additionally, a threshold distance may extend around a perimeter of each of the displays. In one embodiment, this threshold distance may be 50 pixels. Alternatively, other values or a programmable value for the size of the threshold distance may be provided.

Returning to FIG. 6, if the up event 422 is not within the threshold distance, the up event 422 is released 616 to the upper application. When released 616 to the upper application, the upper application receives the up event 422 and may provide the functionality of the application associated with the up event 422. If, however, the up event 422 is within a threshold distance 226 of the edge of the display 110, it may be further determined 606 whether the edge next to which the up event 422 was received is adjacent to another display. If not, the up event 422 is released to the upper application 616. If the up event 422 is received at an edge next to an adjacent display, it may be further determined 608 whether the motion events 420' preceding the up event are in a direction toward the adjacent display. Motion events not in a direction toward another display may indicate the user did not intend to input a gesture spanning the displays. As such, the up event 422 may be released 616 to the upper application. If, as is the case with the up event 422 in FIG. 5, the motion events 420' are toward the adjacent display, the method proceeds and the release 616 of the up event to the upper application is postponed 610. The device may postpone 610 the release of the up event for a pending period or until a down event 432 is received, whichever occurs first. If a down event 432 is not received during the pending period, the up event 422 is released 616 to the upper application. The pending period may be a default value or may be calculated in a manner that will be discussed further below.

Figure 7:
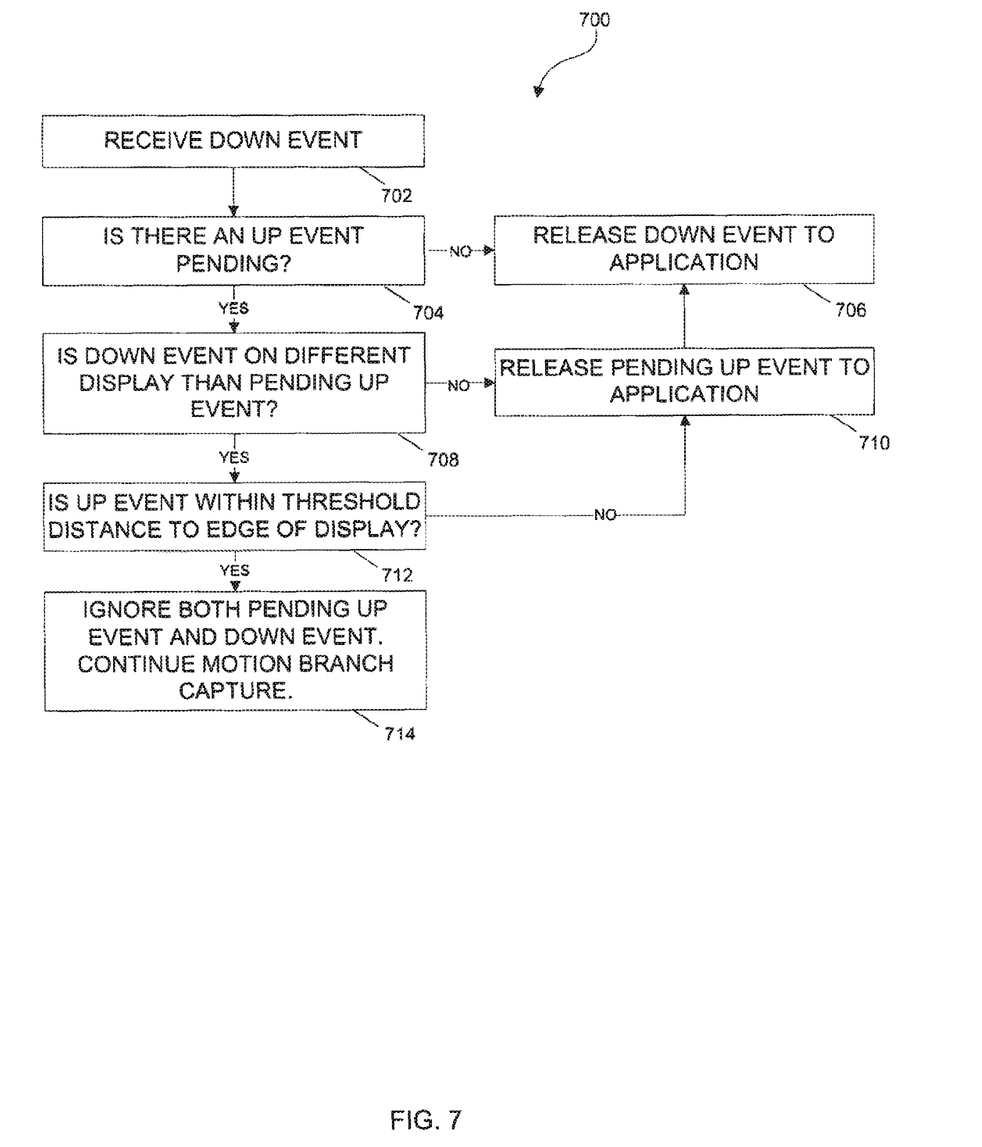
FIG. 7 is a flow chart depicting a portion of an embodiment of a process that may facilitate receipt of a gesture input that spans multiple input devices.

In FIG. 7, a down event process 700 is graphically depicted as a flow chart. The down event process 700 may execute upon receipt of a down event. As such, the down event process 700 initiates with the receipt 702 of a down event 432. The down event process 700 may include determining 704 if there is a pending up event 422 (i.e., an up event that has been postponed 610 in FIG. 6). If there is no pending up event 422, the down event 432 is released 706 to the upper application.

If it is determined 704 that there is a pending up event 422, the down event process 700 determines 708 if the down event 422 was received on a different display than the pending up event 422. That is, it may be determined if there was potentially motion across the seam 210. If the down event 432 and up event 422 were not received on different touch screed devices, the pending up event 422 may be released 710 to the application. In turn, the down event 432 may also be released 706 to the application. If the down event 432 is received on a different display than the pending up event 422, the down event process 700 continues and may include determining 712 whether the down event 432 is received within a threshold distance 236 to the edge of the display 112. If the down event 432 is not received within a threshold distance 236 from an edge next to the adjacent display where a corresponding postponed up event 422 was received, the pending up event 422 may be released 710 and then the down event 432 may be released 706 to the upper application for processing. However, if the down event 422 is within the threshold distance 236 to the edge of the display 112, both the pending up event 422 and down event 432 are ignored. Motion events 420" may continue and be appended to the motion events 420' received prior to the up event 422 that is ignored.

In this regard, if the conditions set forth in the up event process 600 and down event process 700 are fulfilled, the extraneous up and down events 422 and 432 associated with the transition of the gesture 400 from the first touch screen display 110 to the seam 210 and from the seam 210 to the second touch screen display 112 may not be sent to the upper application 350. In turn, the unitary gesture 400 is sent to the upper application and the extraneous up and down events 422 and 432 are transparent to the upper application.

The pending period referenced above with regard to FIG. 6 may affect the overall experience when entering input gestures to the device. When establishing the pending period, a balance must be established between a pending period that does not interfere with the user interaction of the device and a pending period that appropriately responds to a gesture that spans input devices. If the pending period is too short, a down event on another display may be mistakenly determined to be a legitimate down event rather than a down event associated with the spanning of the independent displays. In contrast, if the pending period is too long, the user may notice a lag when waiting for the pending period to end and the legitimate up event to be registered.

As such, a variety of factors may be used to arrive at an appropriate pending period. These factors include, but are not limited to, the distance of the up event to the edge, the seam width, the threshold distance, and the speed of the motion event prior to the up event. In one particular embodiment, the following calculation may be used to arrive at the pending period:

$$\frac{(\text{UP\_EVENT\_LOCATION\_TO\_EDGE} + \text{SEAM\_WIDTH} + \text{THRESHOLD\_DISTANCE})}{\text{MOTION\_SPEED}}$$

wherein "UP_EVENT_LOCATION_TO_EDGE" is the distance in pixels of the up event location to the edge of the display, "SEAM_WIDTH" is the width of the seam between the adjacent displays as measured in pixels, "THRESHOLD_DISTANCE" is the threshold distance in pixels from the edge of the display in which an up event is held pending a further down event, and "MOTION_SPEED" is the speed of the motion event prior to the up event being received as measured in pixels per unit time (e.g., pixels/millisecond).

Additionally, a scenario may exist wherein multiple down events are detected prior to receipt of the up event. With reference to FIG. 5, this may coincide with a situation wherein the user enters a down event 410, motion events 420', and as the user's finger is transitioning from the first touch screen display 110 to the second touch screen display 112, the down event 432 is received prior to the up event 422. This may contravene the above-noted processes 600 and 700 which are designed to first look for an up event 422 and then analyze a subsequent down event 432 to determine if the gesture spans both displays.

In turn, a down event counter (e.g., executing in the global virtual space translation module 330) may be provided. The down event counter may initially be set to a value of 0. A down event may increment the counter up by one and an up event may decrease the counter by 1.

As such, when down event 410 is received, the down counter may increment from 0 to 1. Since the down counter is not larger than 1, down event 410 may be sent to the upper application for processing. However, when the second down event 432 is received, the counter may increment by 1 from 1 to 2. As the counter is larger than 1, after receipt of the down event 432, the down event 432 is be ignored. When the up event 422 subsequently occurs, the down counter is decreased by 1 from 2 to 1. In this regard, the counter's value becomes 1 after receipt of the up event 422. As the down counter is larger than 0 after receipt of the up event 422, the up event 422 will be ignored. When the second up event 430 is received, the counter may be decreased by 1. In this scenario, the down counter value goes from 1 to 0 such that after receipt of the second up event 430, the down counter is 0 and the up event 430 is sent to the application for processing. In this regard, down events may only be sent to the upper application for processing if the down counter is not larger than 1 after the down event has been received. Similarly, up events may only be sent to the upper application for processing if the down counter's value is 0 after receipt of the up event.

While the invention has been illustrated and described in detail in the drawings and foregoing description, such illustration and description is to be considered as exemplary and not restrictive in character. For example, touch screen displays are shown and described. However, the foregoing may be equally applicable to any two independent input devices. As such, input devices other than touch screen displays may implement the foregoing.

For instance, multiple cameras may record user motions to receive a gesture input. In such a case, when the gesture leaves the field of view of one camera and enters the field of view of another camera, a similar instance of extraneous gesture termination and gesture initiation inputs may be received. As such, the methodology presented above regarding determining the extraneous inputs associated with transitioning between input devices could be applied to the situation employing cameras as well.

Also, sensors may be provided to detect the relative orientation and position of the input devices with respect to one another. As such, it may be determined which edges of the input device are adjacent based on a position or orientation of the device. This may be considered when determining whether the branch of motion events is in the direction of another input device and the appropriate location for threshold distances of the input devices.

Additionally, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed is:

1. A method for operating a handheld computing device, comprising:
    receiving a first input event at a first input device, wherein the first input event includes a first down event and a first up event, wherein the first down event is an initiation of a gesture by a user touching the first input device and wherein a first up event occurs when the user stops touching the first input device;
    generating location data that describes the first input event including an identification of the first input device that received the first input event and a location of the first up event on the first input device receiving the first input event;
    translating the location to a global virtual space location in a global virtual space;
    determining if the first up event occurred within a threshold distance from a second input device;
    if the first up event occurred within a threshold distance from the second input device, postponing a release of the first input event for a period of time;
    determining if a second down event, associated with the first up event, occurs within the period of time on the second input device;
    if the second down event, associated with the first up event, occurs within the period of time on the second input device, waiting for a second up event; and
    releasing the first input event after the second up event.

2. The method according to claim 1, wherein the first and second input devices include touch screen displays.

3. The method according to claim 2, wherein the method further includes:
    executing an application on the handheld computing device that is displayed in at least one of the plurality of touch screen displays, the application having a location defined in the global virtual space.

4. The method according to claim 3, wherein the method further includes sending the global virtual space location to the application.

5. The method according to claim 4, wherein the sending operation at least partially depends on the location of the application within the global virtual space such that if the application occupies the entire global virtual space, the global virtual space location is unmodified.

6. The method according to claim 5, wherein if the application occupies less than the entire global virtual space, the global virtual space location is downscaled based on a portion of global virtual space which is occupied by the application.

7. The method according to claim 4, wherein the relative location of the applications with respect to the global virtual display is maintained by a window manager service.

8. The method according to claim 7, wherein the first and second input devices are physically separated on the handheld computing device, and wherein the global virtual space includes a continuous representation of the first and second input devices.

9. The method according to claim 8, wherein the physical arrangement of the first and second input devices is mimicked in the global virtual space.

10. A method for receiving a gesture input spanning a first input device and a second input device, comprising:

detecting a first gesture initiation event;
receiving motion events related to the first gesture initiation event;
sensing a first gesture termination event;
determining if the first gesture termination event occurred within a threshold distance from the second input device;
if the first gesture termination event occurred within a threshold distance from the second input device, postponing a release of the gesture input for a pending period of time;
detecting a second gesture initiation event;
determining if the first gesture termination event and the second gesture initiation event, in combination, include portions of a unitary touch gesture spanning the first input device and the second input device at least partially based on one or more of a location of the first gesture termination event and the pending period of time between the first gesture termination event and the second gesture initiation event; and
based on the determination, releasing the gesture input.

11. The method according to claim 10, wherein if the first gesture termination event and the second gesture initiation event are determined to include portions of a unitary touch gesture spanning the first input device and second input device, the first gesture termination event and second gesture initiation event are not sent to an application executing on the handheld computing device, and wherein if the first gesture termination event and the second gesture initiation event are not determined to include portions of a unitary touch gesture spanning the first input device and second input device, the first gesture termination event and second gesture initiation event are sent to an application executing on the handheld computing device.

12. The method according to claim 11, wherein the determining operation includes ascertaining whether an initiation location of the second gesture initiation event is within a threshold distance to an edge of the second input device adjacent to the first input device.

13. The method according to claim 12, wherein the determining operation includes analyzing the motion events preceding the first gesture termination event with regard to at least one of a direction of travel, a speed, or an acceleration of the motion events.

14. The method according to claim 13, wherein the determining operation includes comparing the first gesture termination event and the second gesture initiation event to determine if the events were received at different input devices.

15. The method according to claim 14, wherein the pending period is determined based on at least one of the location of the first gesture termination event to the edge of the first input device, a distance between the first input device and the second input device, the threshold distance, or the speed of the motion events.

16. The method according to claim 10, wherein the determining operation further includes:
maintaining a count of the number of gesture initiation events, wherein receipt of a gesture initiation increases the count by one and receipt of a gesture termination event decreases the count by one;
wherein a gesture initiation event that results in the count being greater than one is not sent to the application, and wherein a gesture termination event that results in the count being greater than zero is not sent to the application.

17. A method for receiving a gesture input spanning a first input device and a second input device, comprising:
detecting a first gesture initiation event;
receiving motion events related to the first gesture initiation event;
sensing a first gesture termination event;
determining if the first gesture termination event occurred within a threshold distance from the second input device;
if the first gesture termination event occurred within a threshold distance from the second input device, postponing a release of the gesture input for a pending period of time;
detecting a second gesture initiation event;
determining if the first gesture termination event and the second gesture initiation event each includes portions of a unitary touch gesture spanning the first input device and the second input device at least partially based on a first location of the first gesture termination event, a second location of the second gesture initiation event, a characteristic of the motion events preceding the first gesture termination event with regard to at least one of a direction of travel, a speed, or an acceleration of the motion events, a comparison of the first gesture termination event and the second gesture initiation event to determine if the events were received at different input devices, and the pending period of time between the first gesture termination event and the second gesture initiation event; and
based on the determination, releasing the gesture input.

* * * * *